United States Patent [19]

Offer et al.

[11] Patent Number: 5,530,219

[45] Date of Patent: Jun. 25, 1996

[54] REACTOR CORE SHROUD REPAIR WITH WELDED BRACKETS

[75] Inventors: Henry P. Offer, Los Gatos, Calif.;
Lawrence M. Grycko, Lockport, Ill.;
John G. Erbes, Mt. View, Calif.;
James E. Charnley, Nevada City, Calif.; Grant C. Jensen, Morgan Hill, Calif.

[73] Assignee: General Electric Company, San Jose, Calif.

[21] Appl. No.: 312,332

[22] Filed: Sep. 23, 1994

Related U.S. Application Data

[63] Continuation-in-part of Ser. No. 231,614, Apr. 22, 1994, and a continuation-in-part of Ser. No. 237,732, May 4, 1994.

[51] Int. Cl.$^6$ .................................................. B23K 9/00
[52] U.S. Cl. ............................... 219/137 R; 29/890.031; 228/184
[58] Field of Search ......................... 219/137 R, 125.1, 219/125.11; 228/184; 29/890.031

[56] References Cited

U.S. PATENT DOCUMENTS

| | | | |
|---|---|---|---|
| 1,995,546 | 3/1935 | Meier | 219/137 R |
| 4,285,503 | 8/1981 | Calhoun et al. | 29/890.031 |
| 4,294,662 | 10/1981 | Guignard et al. | 219/137 R |
| 4,299,658 | 11/1981 | Meuschke et al. | 29/890.031 |
| 4,409,466 | 10/1983 | Commeau | 228/184 |
| 5,402,570 | 4/1995 | Weems et al. | 29/890.031 |

FOREIGN PATENT DOCUMENTS

| | | |
|---|---|---|
| 0459021 | 12/1991 | European Pat. Off. . |
| 60-102591 | 6/1985 | Japan . |

OTHER PUBLICATIONS

GE Proposal No. 894–1D7DM–EK1, Revision 1, Core Spray Line Crack Repair, Dec. 9, 1993.
Shroud Repair, Description of Alternatives, Alan N. Baker, Mar. 1994.
Apr. 22, 1994 letter from Al Kozusko & Thomas Sliva of AEA O'Donnell, Inc. to Victor Bain of General Electric Company with annexed Description, facsimile cover sheet and drawings.

Presentation No. 94–004 dated May 2, 1994, by Welding Services Inc. and Structural Integrity Associates, Inc.

Patent Abstracts of Japan, vol. 7, No. 179 (M–234), Aug. 9, 1983 & JP-A-58081592 (Shimamoto Takijirou), May 16, 1983.

*Primary Examiner*—Clifford C. Shaw
*Attorney, Agent, or Firm*—James E. McGinness

[57] ABSTRACT

A welded bracket for use in repairing a shroud in which one or more shroud girth seam welds have experienced stress corrosion cracking. A plurality of the welded brackets are placed around the outer circumference of the shroud at a plurality of azimuthal positions at the elevation of the top guide support ring. Each bracket is constructed by welding curved plates. Welding productivity is increased by using an extremely thin weld joint design with a non-circular cylindrical, thin welding electrode having an elongated cross-sectional shape. During welding, the elongated dimension is aligned parallel with the length of the weld joint. This combination enables joining of the welded bracket parts with both the initial weld joint preparation and the completed weld having a uniquely thin width and with a high aspect ratio of depth to width. This high aspect ratio reduces the number of weld beads needed to build the weld joint. The high aspect ratio, in combination with torch travel speeds of 12 or more inches per minute, increase welding productivity, thereby reducing reactor downtime resulting from shroud repair.

20 Claims, 7 Drawing Sheets

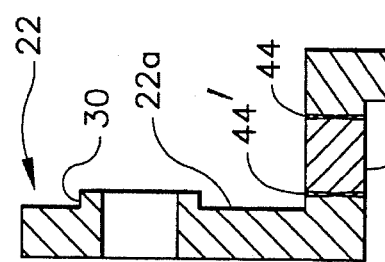
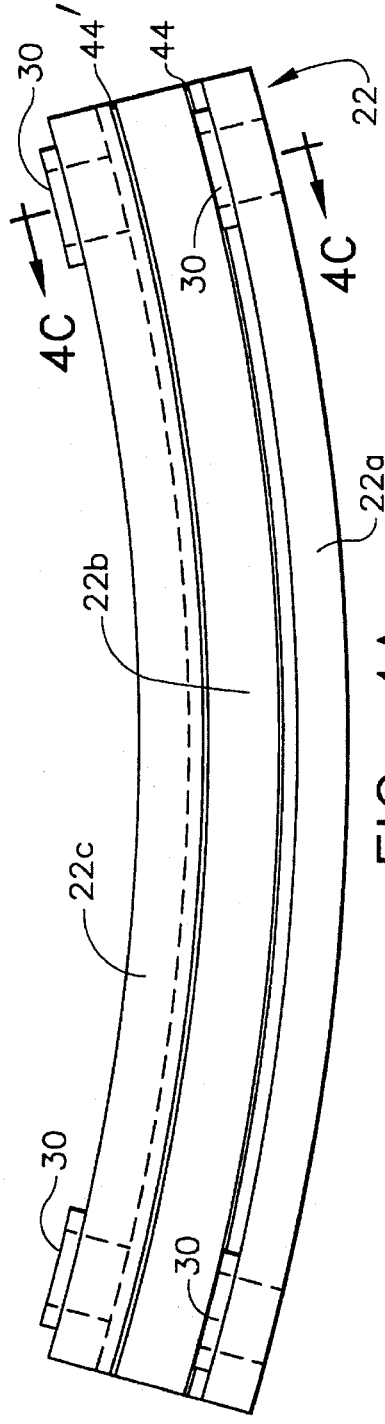
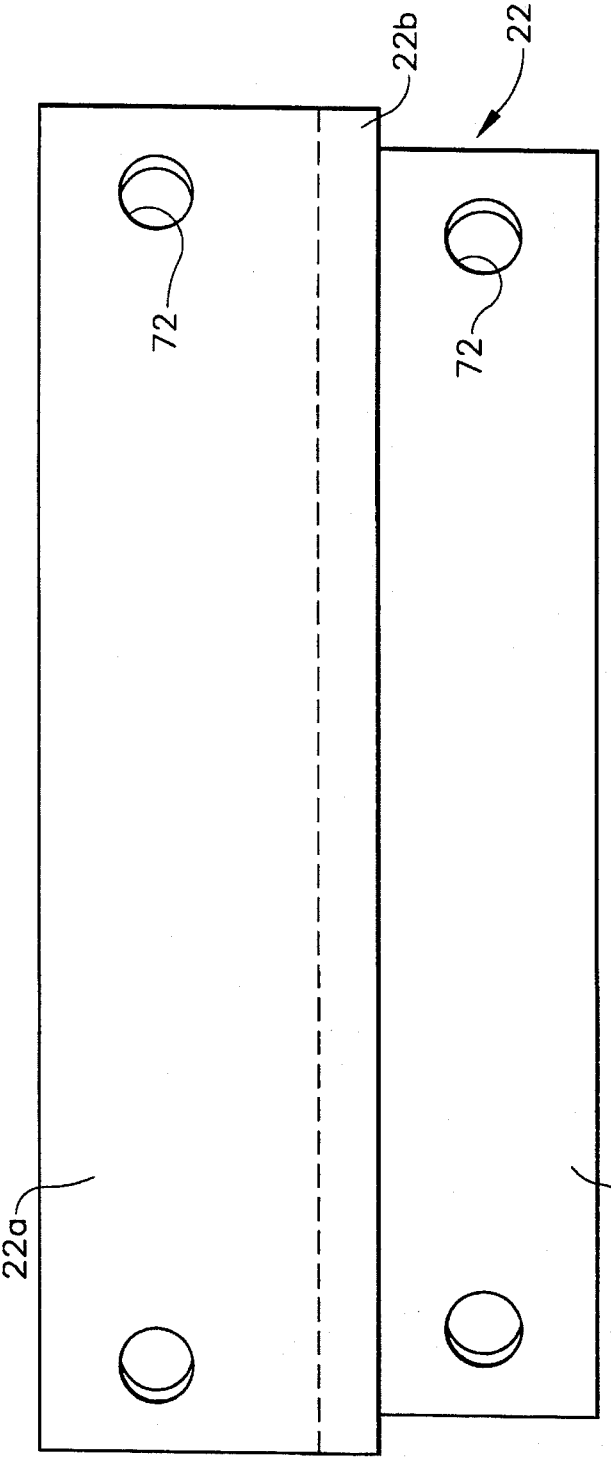
FIG. 4A
FIG. 4B
FIG. 4C

REACTOR CORE SHROUD REPAIR WITH WELDED BRACKETS

RELATED PATENT APPLICATIONS

This application is a continuation-in-part application of U.S. patent application Ser. No. 08/231,614 entitled "Method and Apparatus for Joining Metal Components with Mitigation of Residual Stresses" and filed on Apr. 22, 1994, pending; and of U.S. patent application Ser. No. 08/237,732 entitled "Welding Electrode with Flat Blade and Related Method of Manufacture" and filed on May 4, 1994, pending.

FIELD OF THE INVENTION

This invention relates to maintenance and repair of nuclear reactors. In particular, the invention relates to the repair of the fuel core shroud of a boiling water reactor.

BACKGROUND OF THE INVENTION

Stress corrosion cracking (SCC) is a known phenomenon occurring in reactor components, such as structural members, piping, fasteners, and welds, exposed to high-temperature water. The reactor components are subject to a variety of stresses associated with, e.g., differences in thermal expansion, the operating pressure needed for the containment of the reactor cooling water, and other sources such as residual stress from welding, cold working and other inhomogeneous metal treatments. In addition, water chemistry, welding, heat treatment, and radiation can increase the susceptibility of metal in a component to SCC.

Stress corrosion cracking has been found in the shroud girth seam welds or heat affected zones of the core shroud. This diminishes the structural integrity of the shroud, which vertically and horizontally supports the core top guide and the shroud head. Thus, there is a need for a method and an apparatus for repairing a shroud which has cracks in or near the shroud girth seam welds.

SUMMARY OF THE INVENTION

The present invention is a method and an apparatus for repairing a shroud in which one or more shroud girth seam welds have experienced SCC. The method involves the placement of a plurality of brackets around the outer circumference of the shroud at a plurality of azimuthal positions, held by shear pins positioned between jet pump assemblies. In the event of multiple cracked shroud girth seam welds, respective pluralities of brackets are installed at respective elevations. The brackets are intended to structurally replace the shroud girth seam welds which are cracked.

The shroud repair brackets in accordance with the invention are designed to support the top guide, the fuel bundle assemblies and the shroud head. The brackets are further designed to withstand the thermal and radiological conditions which the shroud is exposed to.

In the special case where the cracked shroud girth weld is located at the juncture of two shroud sections of different diameter, namely, at the top guide support ring, the preferred bracket configuration is a welded assembly of curved plates. In particular, each bracket for reinforcing a cracked top guide support ring comprises upper and lower curved plates having different radii of curvature and an intermediate arcuate plate having an inner circumferential portion welded to an outer circumferential portion of the lower curved plate and having an outer circumferential portion welded to an inner circumferential portion of the upper curved plate.

Because the repair of a shroud damaged by stress corrosion cracking involves the installation of a plurality of shroud repair brackets of the welded variety, it is desirable to speed up the repair by increasing the welding productivity. In accordance with the present invention, this is accomplished by a welding process in which the number of weld beads is reduced as compared to the number of weld beads required using conventional welding techniques. The process combines an extremely thin weld joint design with a non-circular cylindrical, thin welding electrode having an elongated cross-sectional shape. During welding, the elongated dimension is aligned parallel with the length of the weld joint. This combination enables joining of components with both the initial weld joint preparation and the completed weld having a uniquely thin width and with a high aspect ratio of depth to width. Use of this high-aspect-ratio weld joint process substantially increases productivity and has the side effect of improving the residual stress state of the final welded assembly. The increased welding productivity reduces reactor downtime resulting from shroud repair, thereby providing cost savings to the plant operator.

The welding process of the invention is effective in mitigating residual stresses and the associated welding strains (distortion) in joints having any path shape, whether welded from one or more sides of the material. The welding process of the invention also reduces the heat input into the heat-affected zones, thereby mitigating the potential for grain growth and thermal sensitization of the welded joint.

Further, the present invention is a highly thermal and time efficient process for welding reactor components wherein the conductive self-cooling effects of the base metal alone, when combined with a very thin weld joint design, are capable of significantly improving the residual stress of component weld joints without the need for water or other cooling of the component during the welding. Due to the combined high heating efficiency, the high heating and cooling rates, the thin joint design of the disclosed process, and the corresponding small size of each weld pass, the required temperature gradient and thermal stress, and resulting improved residual stress distribution are established through the thickness of the material being welded. The final levels of residual stresses are established as the outer passes of the joint are completed.

BRIEF DESCRIPTION OF THE DRAWINGS

FIGS. 4A, 4B and 4C are respectively top, rear and sectional views of a welded shroud repair bracket in accordance with the preferred embodiment of the invention.

FIGS. 9A–9C are front, side and bottom views respectively of the electrode geometry in accordance with another preferred embodiment of the present invention.

DETAILED DESCRIPTION OF THE PREFERRED EMBODIMENTS

Figure 1:
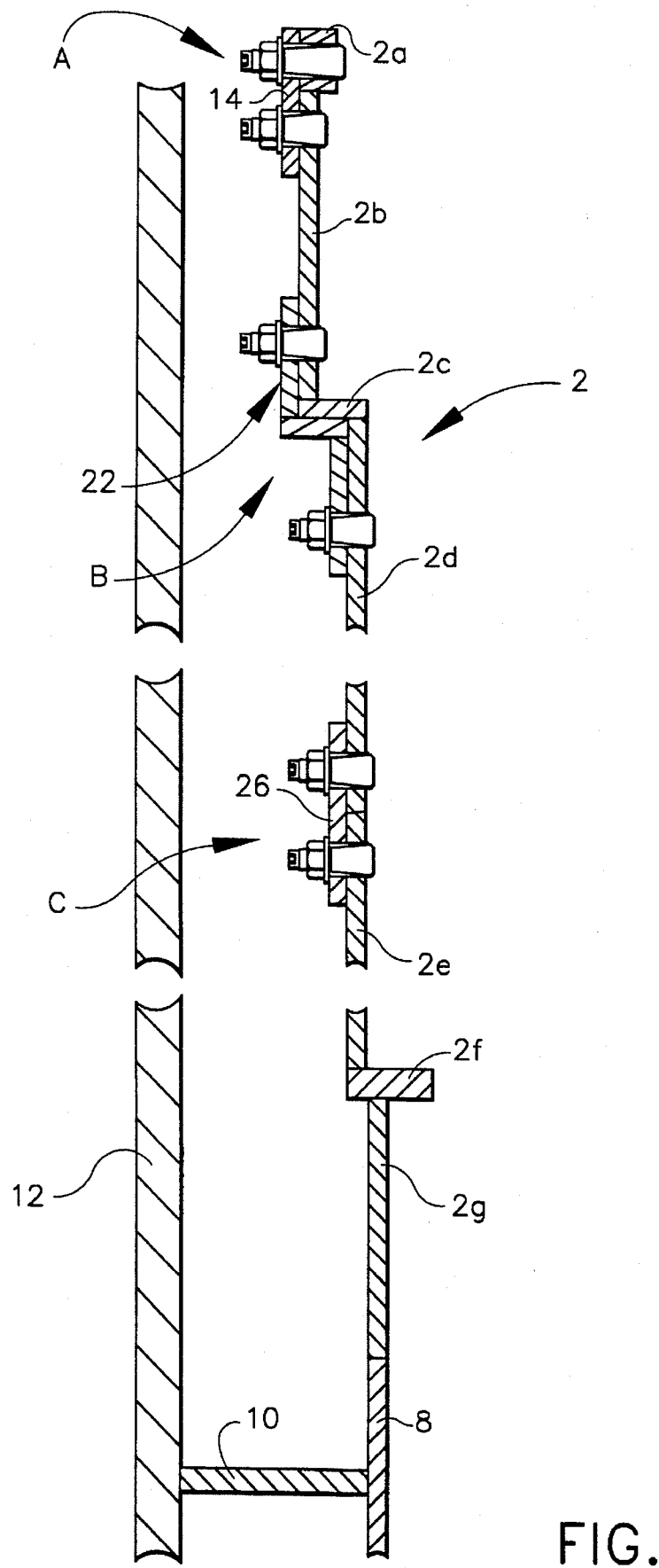
FIG. 1 is a sectional view of a portion of the core shroud of a BWR with shroud repair bracket assemblies installed at three different elevations.

Referring to FIG. 1, the core shroud 2 of a conventional BWR comprises a shroud head flange 2a for supporting the shroud head; a circular cylindrical upper shell section 2b welded to shroud head flange 2a; an annular top guide support ring 2c welded to upper shell section 2b; circular cylindrical top and bottom mid-core shell sections 2d and 2e joined at core mid-plane weld 6, with top section 2d welded to top guide support ring 2c and bottom section 2e welded to an annular core plate support ring 2f; and a lower shell section 2g welded to the core plate support ring 2f. The top and bottom sections 2d and 2e of the mid-core shell section are of equal diameter. The diameter of upper shell section 2b is greater than the diameter of mid-core shell sections 2d and 2e, which is in turn greater than the diameter of lower shell section 2g. The entire shroud is supported by shroud support 8, which is welded to the bottom of lower shell section 2f, and by annular shroud support plate 10, which is welded at its inner diameter to shroud support 8 and at its outer diameter to RPV 12. All of the aforementioned welds extend around the entire circumference of the shroud and constitute the shroud girth seam welds.

Stress corrosion cracking has been found in the shroud girth seam welds or heat affected zones thereof. To repair damaged shrouds, a plurality of shroud repair bracket assemblies are arranged around the shroud circumference at the elevation of the stress corrosion cracking. The purpose of these bracket assemblies is to structurally replace the shroud girth seam welds which are potentially undermined by cracks. Brackets may be installed only at welds found to have cracking.

Figure 2:
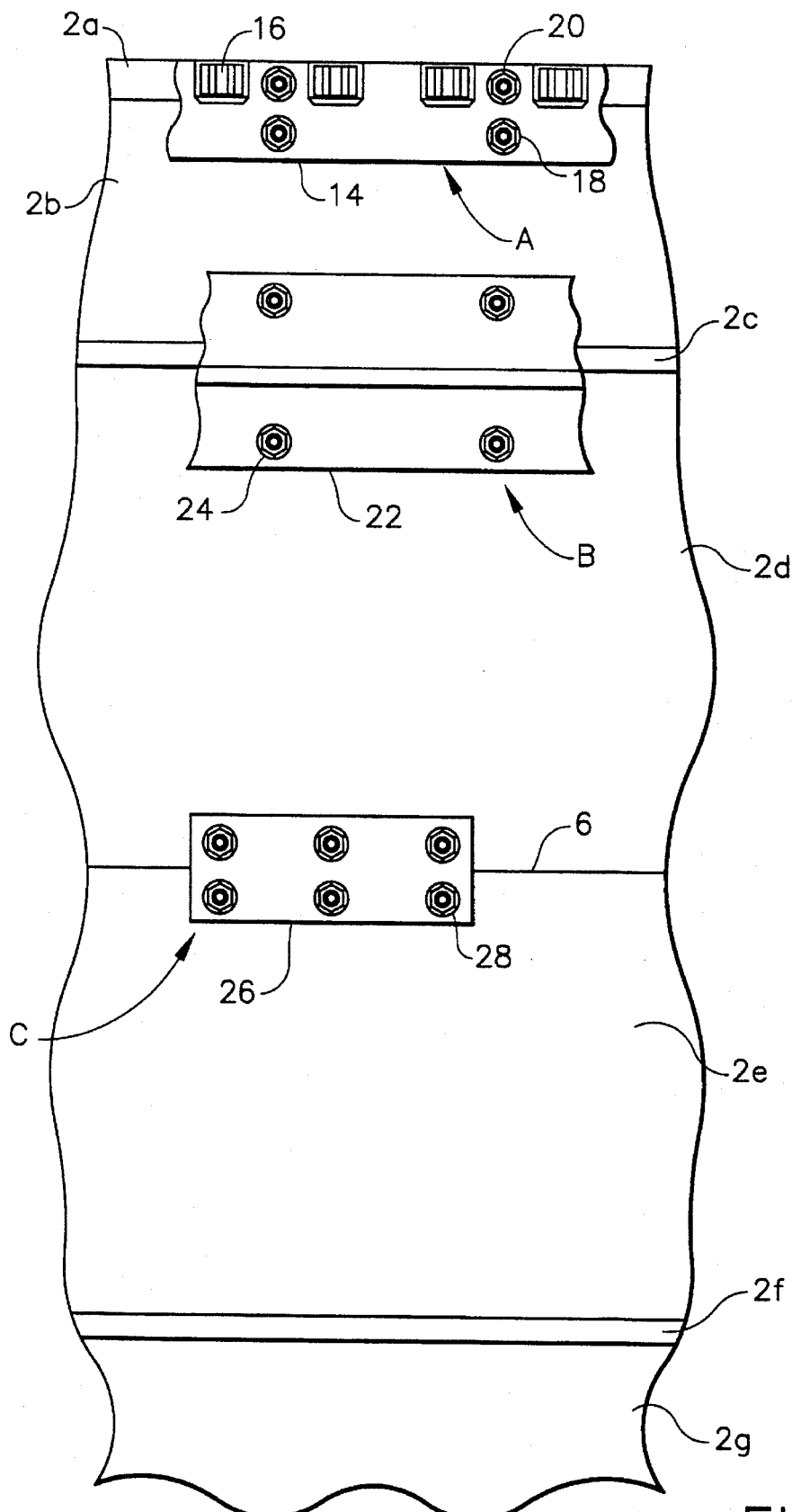
FIG. 2 is an azimuthal view of the shroud repair bracket assemblies depicted in FIG. 1.

Each shroud repair bracket is fastened to the shroud above and below the crack elevation in a manner which will prevent relative movement across the shroud girth seam welds during all normal and upset conditions. As seen in FIGS. 1 and 2, in accordance with the repair technique of the present invention, a plurality of bracket assemblies are installed at different elevations: assembly A for reinforcing cracks in the welds joining shroud head flange 2a to upper shell section 2b; assembly B for reinforcing cracks in the top guide support ring 2c; and assembly C for reinforcing cracks in the core mid-plane weld 6.

Bracket assembly A has a bracket 14 for splicing shroud head flange 2a to upper shell section 2b when cracking occurs in the girth welds joining those sections. Preferably, bracket 14 is a curved plate having a radius of curvature approximately equal to the outer radius of upper shell section 2b. As seen in FIG. 2, bracket 14 is provided with a notch for each shroud head bolt lug 16 to be circumvented. Bracket 14 is fastened to upper shell section 2b by two tapered pins 18 and to shroud head flange 2a by two tapered pins 20, pins 20 being longer than pins 18.

Bracket assembly B has a bracket 22 for splicing upper shell section 2b to top section 2d of the mid-core shell section when the top guide support ring 2c is cracked. Welded bracket 22 is fastened to upper shell section 2b and to top section 2d of the mid-core shell section by respective pairs of tapered pins 24.

Finally, bracket assembly C has a bracket 26 for splicing top section 2d to bottom section 2e of the midcore shell section when the core mid-plane girth weld is cracked. Preferably, bracket 26 is a curved plate having a radius of curvature approximately equal to the outer radius of the mid-core shell section. Bracket 26 is fastened to top section 2d and to bottom section 2e of the mid-core shell section by respective trios of tapered pins 28.

Figure 3:
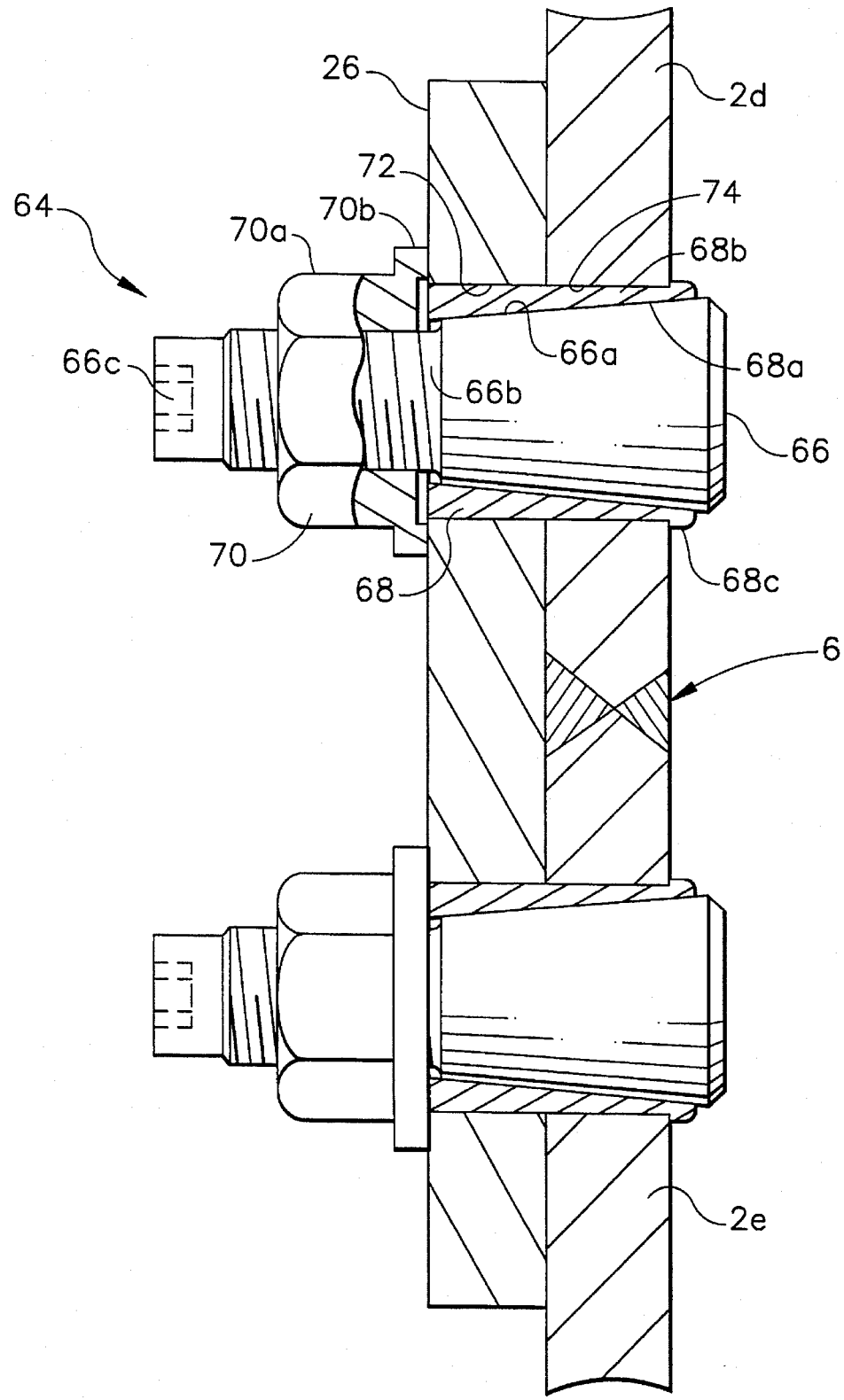
FIG. 3 is a detailed sectional view of an installed shroud repair bracket assembly with tapered pins.

In accordance with the disclosed shroud repair technique, each bracket is fastened to the shroud using tapered pin assemblies which couple with aligned holes in the bracket and shroud. For example, as seen in FIG. 3, circular holes 72 in bracket 26 and circular holes 74 in the shroud wall are of equal diameter. Holes 74 are remotely machined in the shroud wall by a conventional electric discharge or other suitable machining technique. Bracket 26 is then fastened to the top and bottom sections 2d and 2e of the mid-core shell section by tapered pin assemblies. Each tapered pin assembly comprises a threaded tapered pin 66, a slotted sleeve 68 and a threaded nut 70. The tapered pin has threaded portion 66b and a socket 66c on one end and an external conical, i.e., tapered, surface 66a on the other end. Each tapered pin 66 is held inside the holes 72, 74 by slotted sleeve 68 and threaded nut 70.

When fully installed, the tapered portion of pin 66 is encased by slotted sleeve 68. The sleeve has a longitudinal slot which allows the sleeve to be flexed radially outward into a configuration having an expanded diameter. The flexed sleeve 68 has an internal conical surface 68a which matches the external conical surface 66a of pin 66; an external surface 68b having a radius of curvature which matches the radius of curvature of hole 72 in the bracket and hole 74 in the shroud; and a raised flange 68c to act as an axial position stop.

Although not described in detail, brackets 14 and 22 are attached to the shroud using tapered pin assemblies having the same design as described hereinabove. These tapered pin assemblies can be entirely inserted from one side of the shroud. Prior to insertion, the unflexed sleeve 68 is slid onto the tapered pin 66 and then the nut 70 is threaded onto the pin for a number of turns sufficient to hold the unflexed sleeve 68 in place. At this stage, the diameter of annular flange 68c is less than the diameter of the holes 72, 74 in the bracket and shroud wall, allowing the sleeve 68 to pass through the holes. The assembly is then pushed through the aligned holes in the bracket and shroud wall until the nut 70 abuts the bracket 62c. Once the raised flange 68c of the sleeve 68 clears the inner edge of hole 74 in the shroud wall 2d, nut 70 is tightened to pull tapered pin 66 back until the assembly is seated, i.e., the annular flange 68c on the sleeve latches behind the shroud wall. During this operation, the sleeve is held in place initially by a thrust plate on the tool (not shown), reacting between the nut and the sleeve, and then after some expansion, by the raised flange bearing against the inner circumferential surface of the shroud wall. Higher axial load is then applied with a tensioner. This applies a contact pressure between the pins, sleeve, bracket and shroud.

The nut 70 has internal threads which engage the external threads on the threaded portion 66b of pin 66. During installation of the tapered pin assembly 64, a tool is inserted into socket 66c of pin 66 to prevent pin rotation. A tool with a hexagonal socket is coupled to the hexagonal head 70a of nut 70 and used to remotely tighten nut 70. Nut 70 further comprises a built-in washer 70b which has a circumferential flange of radius greater than the radius of hole 72. Thus, when nut 70 is tightened, the flange of washer 70b bears against the bracket 62c on the perimeter of hole 72, not against the end of the sleeve.

The outwardly flexed sleeve 68 has an outer circular cylindrical surface 68b of radius equal to the radius of circular holes 72 and 74. The tapered portion 66a of pin 66 applies increasing pressure on sleeve 68 during pin tensioning. When pin 66 is tensioned to the desired amount, nut 70 is tack-welded to the threaded portion 66b of pin 66 to lock the assembly in place. The tensioned pin assembly exerts a radially outwardly directed contact pressure on the cylindrical surfaces of the aligned circular holes 72, 74 respectively formed in the bracket and shroud, to hold the assembly securely in place.

A stud tensioning device can be used to apply large contact pressures, which result in a large friction force which will react loads axial to the pin assembly. Alternatively, where blind installation is not required, the sleeve flange and the head of the tapered pin could be large so that the required preload is small.

Figure 5:
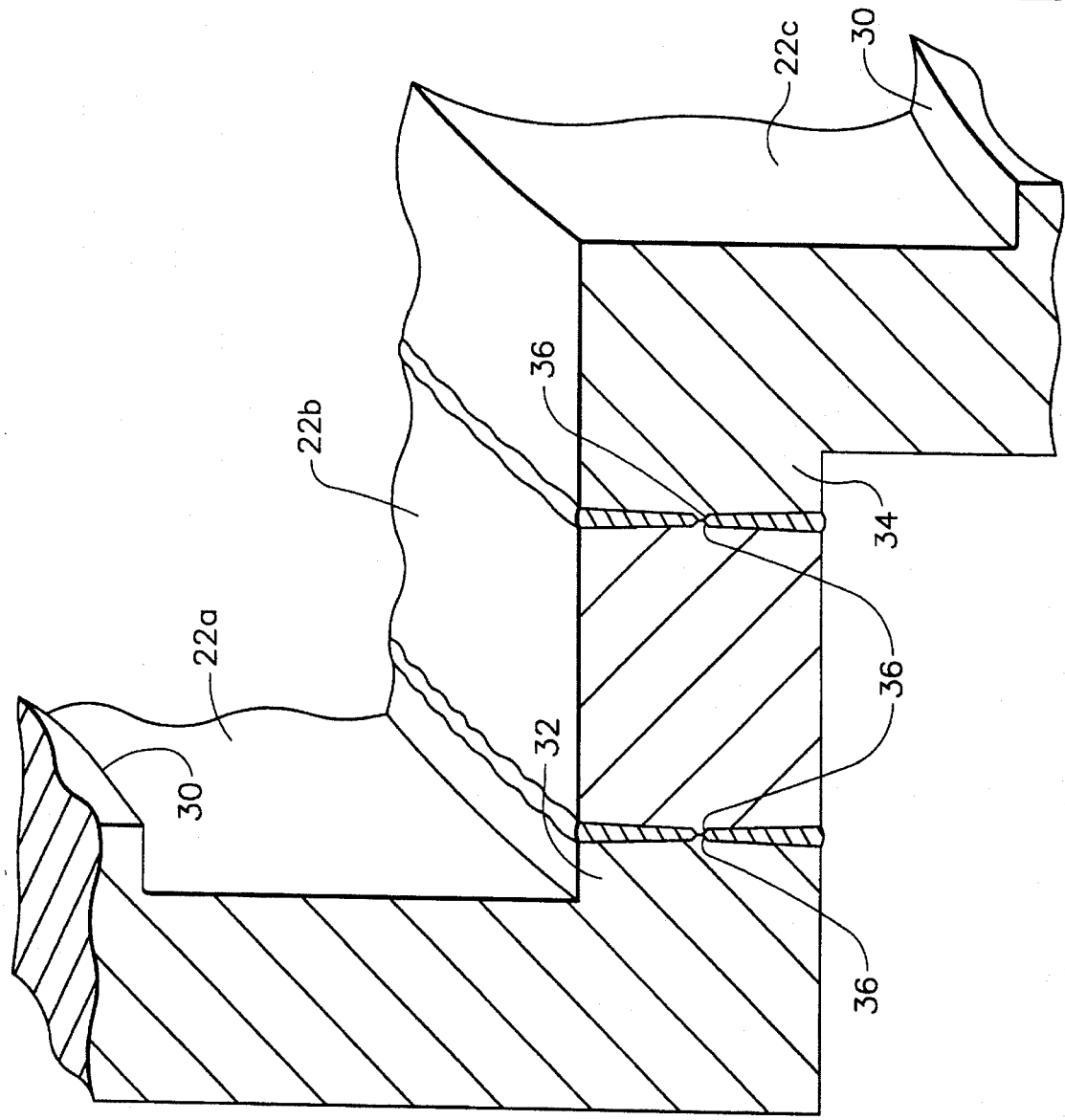
FIG. 5 is a fragmentary isometric sectional view of the welded shroud repair bracket shown in FIGS. 5A–5C.

In accordance with the present invention, bracket 22 is a welded assembly of curved plates, as shown in detail in FIGS. 4A–4C and 5. The upper curved plate 22a has a radius of curvature approximately equal to the outer radius of upper shell section 2b and the lower curved plate 22c has a radius of curvature approximately equal to the outer radius of top section 2d of the mid-core shell section. Each of curved plates 22a and 22c has a straight vertical cross section and an arcuate horizontal cross section, i.e., is a circular cylindrical section. The inner circumferential surfaces of the upper and lower curved plates 22a and 22c are provided with raised bearing pads 30 which extend around the periphery of holes 72. These pads allow local machining to precisely match the contact surface of the bracket to the curved external surface of the shroud wall. Upper and lower curved plates 22a and 22c are further provided with respective circumferential extensions 32 and 34 which are respectively welded to opposing circumferential faces of an intermediate arcuate plate 22b, as seen in FIG. 5. The bracket parts 22a, 22b and 22c are all made of the same austenitic stainless steel, preferably Type 316L stainless steel.

Figure 6:
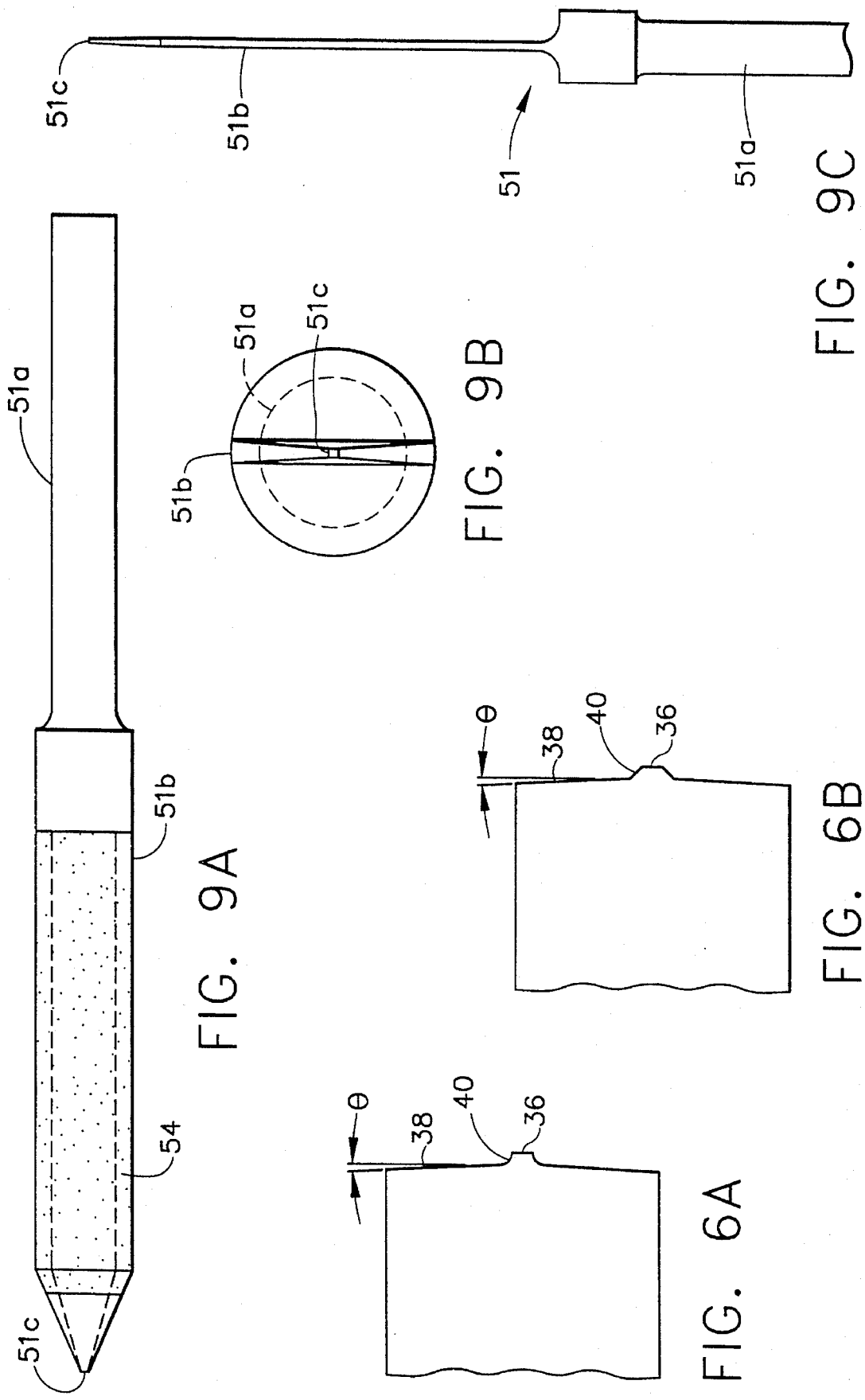
FIGS. 6A and 6B are schematic illustrations of the groove geometries of the bracket parts to be joined by welding in accordance with the present invention.

As shown in FIG. 6B, each opposing face has a land 36 projecting radially from the midline of that face and a pair of beveled surfaces 38. In accordance with the present invention, θ is preferably less than 5° and may be as small as 0°. A respective extension surface 40 connects the outer edge of land 36 with the inner edge of the respective beveled surface 38. Each extension surface 40 is preferably inclined at an angle of 45°. Alternatively, the extension surface 40' can be radiused as shown in FIG. 6A.

Figure 7:
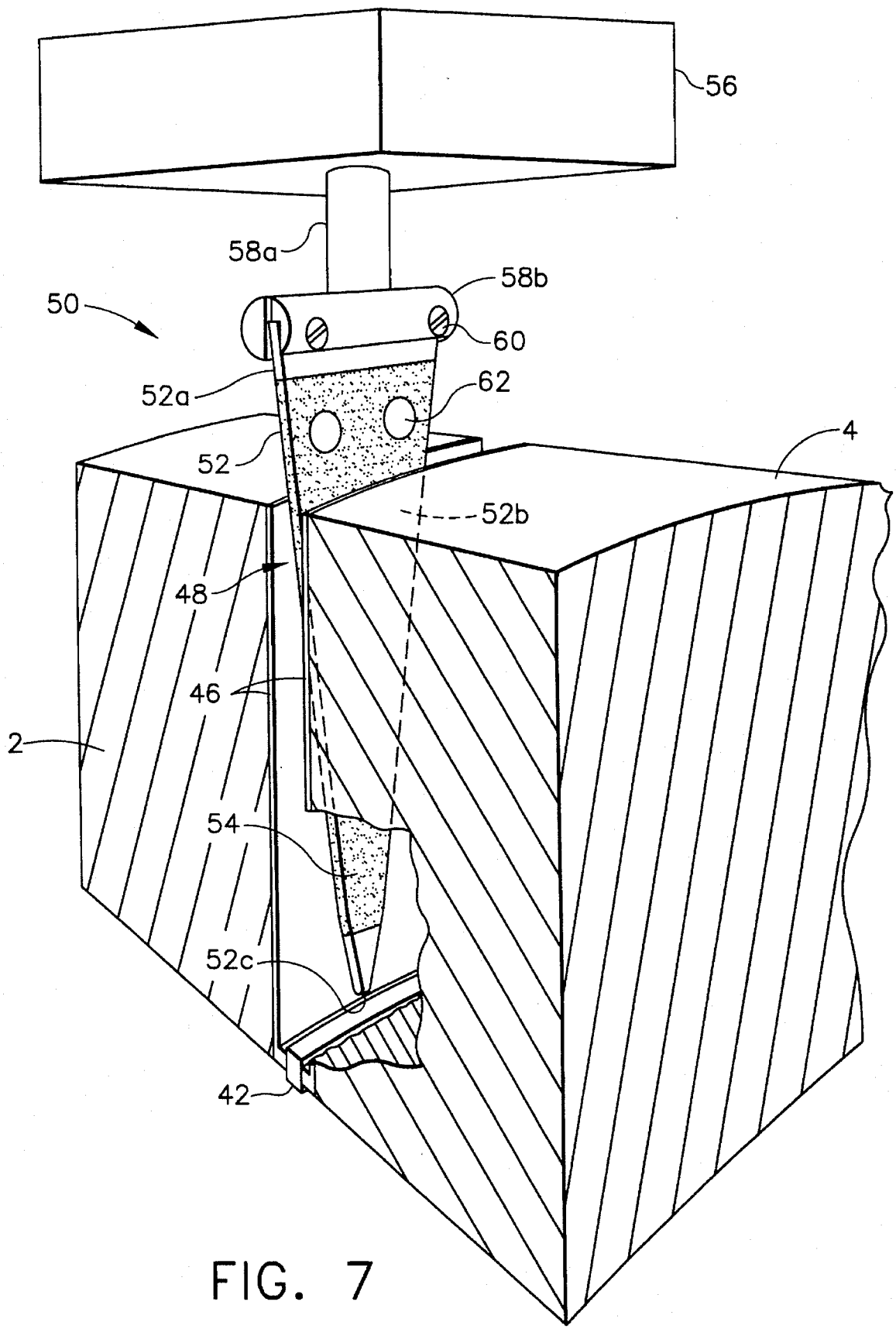
FIG. 7 is a fragmentary isometric sectional view of a welding equipment assembly which can be used to weld a shroud repair bracket in accordance with the present invention.

The opposing lands 36 at each joint form the weld root at the start of welding. Optionally, an arcuate consumable insert 42, made of welding material, may be positioned between opposing lands 36 to assist in forming the weld root, as depicted in FIG. 7. Welding of joints 44, 44' is performed using respective welding electrodes inserted into the respective grooves on opposing sides of the lands 36. The welding electrodes can operate alternatingly or simultaneously. Each joint 44, 44' is built up by depositing beads of welded material in successive passes of the welding electrode. After the root pass, each welding electrode performs one or more hot passes, a plurality of fill passes, and one or more cap passes until the grooves on both sides of the root pass are filled.

In accordance with the present invention, the welded joints 44 and 44' lie in respective circumferential planes which are concentric (see FIG. 4A). This is in contrast to the cracked girth welds being reinforced, which welds lie in radial planes.

The thickness of each bracket is selected based on the available space and the structural requirements. The preferred thickness is in the range of 1 to 3 inches. The number and location of tapered pins is selected based on the maximum structural loads that must be carried by the repair brackets. The primary structural loads are due to postulated seismic events. The preferred configuration is four pins per bracket. However, six, eight, twelve or more pins could be used. The size of the bracket in the circumferential direction is determined based on the space available. The preferred width is approximately 3 to 5 feet. The height of the brackets is approximately 1 to 5 feet. Each pin assembly has an outside diameter equal to 2 to 5 inches.

Figure 8:
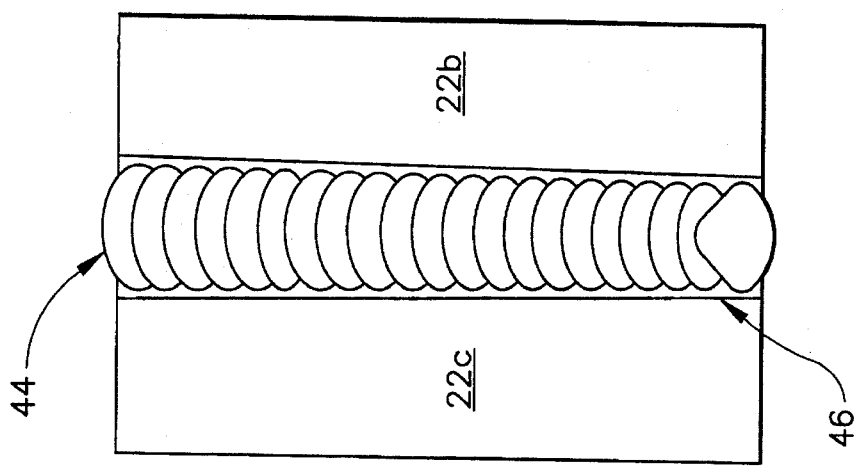
FIG. 8 is a schematic illustration of a joint welded in accordance with the technique of the present invention.

The welding equipment used to weld the shroud repair bracket in accordance with the preferred embodiment of the invention comprises a gas tungsten arc welding system with mechanized torch movement which is used in conjunction with a unique tungsten electrode geometry. The welding process comprises the step of creating a unique weld joint geometry, the welding of which is made possible by the novel electrode shape and made practical by other special features of this welding process. The bevels 38 on either side of the land 36 (see FIG. 6B) preferably each have an acute angle less than 5°. Thus, the groove between opposing beveled surfaces is filled with weld material having a reduced width that requires less heat to achieve fusion. The result is a weld joint 44 having a narrow heat-affected zone 46 as seen in FIG. 8.

A welding electrode is used in which the blade has a non-circular cross section, e.g., a cylinder having a generally rectangular cross section. The blade may be cut or stamped from a flat sheet material, e.g., tungsten alloy sheet stock. The blade can be cut in the shape of a triangle (preferably isosceles) or a strip having parallel straight sides and a pointed tip at one end. The thin electrode geometry provides an electrode having a dimension (i.e., the width) which is less than the diameter of a circular cylindrical electrode of equal cross-sectional area. This thinner dimension and its orientation enables the electrode to enter thin grooves which a conventional circular cylindrical electrode is too wide to enter. Accordingly, the width of the joint to be welded can be made significantly smaller than is the case were a circular cylindrical electrode to be used. Further, the use of a non-cylindrical, thin electrode allows the weld heat input to be significantly reduced for each pass, and therefore the size of the heat-affected zone and the potential for sensitization of the heat-affected zone are correspondingly reduced. The elongated-cross section electrode used in the welding process is basically not limited in how thin it can be, and therefore how thin the weld joint can be, as long as there is clearance to the walls of the joint for forward travel.

As seen in FIG. 7, during welding of each weld joint in the shroud repair bracket, the weld beads are deposited inside the groove using a thin elongated tungsten alloy electrode 50 to melt the filler wire fed into the groove. Electrode 50 fits inside the curved groove 48 with clearance between the electrode and the sidewalls. Blade 52 of electrode 50 is optionally covered with a ceramic coating 54 to prevent arcing to the side walls of groove 48. Suitable exemplary ceramic coatings include $Al_2O_3$ or $Y_2O_3$. The electrode is electrically coupled to a conventional welding torch 56. The flat electrode in conjunction with the small bevel angle and selected welding parameters produce a very thin weld joint, as shown in FIG. 8.

As seen in FIG. 7, the flat tungsten alloy electrode 50 comprises a flat generally triangular blade 52 stamped or cut from tungsten alloy sheet. An exemplary thickness of the tungsten alloy sheet is 30 mils. The triangular shape allows a plurality of interleaved blades to be stamped or cut from a single sheet of tungsten alloy with very little wastage. Optionally the triangular shape of the blade may depart from being strictly isosceles by narrowing the tip at an increased rate.

As depicted in FIG. 7, blade 52 comprises a base 52a, a body 52b and a tip 52c. The base 52a is clamped or otherwise held by a blade holder 58. Blade holder 58 is preferably made of a conductive, oxidation-resistant material such as copper alloy (e.g., beryllium copper alloy), optionally electroplated with silver or nickel. The blade holder preferably takes the form of a T-shaped metal body, comprising a shank 58a and a crosspiece 58b. Shank 58a is connected to a conventional welding torch 56. The crosspiece 58b has a longitudinal slot shaped for receiving the blade base 52a with sufficient play to allow easy insertion and removal. The blade base 52a is held securely in the crosspiece slot by tightening a pair of set screws 60 in a corresponding pair of threaded holes formed in the crosspiece. The blade can be readily removed from the holder after the screws have been loosened. This allows easy replacement of a damaged electrode blade. Also interchangeable electrode blades having different dimensions can be selectively installed depending on the specific application.

The flat triangular blade 52 incorporates one or more insulating stand-offs 62. Each stand-off 24 consists of a slug of insulating material, e.g., $Al_2O_3$ or $Y_2O_3$, having a circular cylindrical peripheral wall and a pair of slightly convex opposing surfaces. Thus the stand-offs protrude beyond the plane of the blade surface, thereby maintaining a minimum gap between the side walls of the welding groove and the flat sides of the electrode blade. This prevents scratching or excessive wear of the ceramic coating during electrode travel in the welding groove.

As an alternative to the welding electrode made from tungsten alloy sheet, a flat tungsten alloy electrode having the geometry shown in FIGS. 9A–9C can be used. Electrode 10 comprises a circular cylindrical shank 10a, a non-circular cylindrical blade 10b and a tip 10c. Blade 10b is optionally covered with an insulating coating. All sharp corners are radiused to prevent arcing. The cross section of blade 10b preferably has the shape of a rectangle with rounded corners.

The very thin joint between bracket parts allows the side walls of the groove to be in mutual proximity. As a result of this closeness, both surfaces are simultaneously wetted by a smaller molten weld pool with a significantly lower heat input rate (i.e., improved thermal efficiency) than is otherwise possible. This reduction in heat input per weld pass to the deposited filler material and base materials being welded allows the size and temperature of the heat-affected zone adjacent to the fused zone to be significantly reduced, with the benefit of a corresponding reduction in SCC sensitivity of susceptible materials.

Different inert gas mixtures can be used as the shield gas, for example, 95% argon-5% hydrogen. The mixture of argon and hydrogen increases the temperature of the arc, causing the weld puddle to wet the substrate more quickly. Because of the high energy density, the skin of the substrate is heated quickly, leaving no time for the conduction of heat below the skin. This produces a thinner heat-affected zone than is conventionally known. The addition of hydrogen also shortens the arc, so that less clearance to the side walls is needed. Alternatively, helium can be used in place of or in addition to hydrogen.

Further, the torch travel speed during welding can be varied to be 12 or more inches/min. For example, during production of welded shroud repair brackets, an exemplary welding sequence included a root pass made with a torch travel speed of 5.5–7.0 inches/min, hot passes and inner fill passes made with a torch travel speed of 10 inches/min, and outer fill passes and cap passes made with a torch travel speed of 10 or 12 inches/min. The higher torch travel speeds allow the puddles of weld material to freeze quickly, thereby contributing to the high productivity attainable by the welding process of the invention. The amperage, voltage, wire feed speed and pulse/dwell protocol can also be adjusted as necessary based on empirical results.

The foregoing preferred embodiment of a shroud repair bracket welded assembly has been disclosed for the purpose of illustration. Variations and modifications of the disclosed structure and welding technique will be apparent to practitioners skilled in the art of welding. All such variations and modifications which do not depart from the concept of the present invention are intended to be encompassed by the claims set forth hereinafter.

We claim:

1. A welded bracket comprising a first circumferential plate section having a first radius and a second circumferential plate section having a second radius, and an arc-shaped intermediate radial plate section having a radially outer surface connected to said first circumferential plate section and a radially inner surface connected to said second circumferential plate section, wherein said first and second circumferential plate sections are connected to said intermediate radial plate section by first and second circumferential weld joints respectively, said first and second circumferential plate sections extending perpendicular to said intermediate radial plate section and in opposite directions.

2. The welded bracket as defined in claim 1, wherein said first circumferential plate section and said intermediate radial plate section in an unjoined state are separated by first upper and lower circumferential grooves, and said first circumferential weld joint is made by a process comprising the steps of melting weld material inside said first upper circumferential groove, and solidifying said melted weld material to form a fused bead, said weld material being melted by discharging an arc of electric current from a tip of a first electrode, said first electrode comprising a blade having an end joined and electrically connected to said tip of said first electrode, said blade of said first electrode having a non-circular cross section along at least a portion of its length.

3. The welded bracket as defined in claim 2, wherein said process for making said first circumferential weld joint further comprises the steps of melting weld material inside said first lower circumferential groove, and solidifying said melted weld material to form a fused bead, said weld material being melted by discharging an arc of electric current from a tip of a second electrode, said second electrode comprising a blade having an end joined and electrically connected to said tip of said second electrode, said blade of said second electrode having a non-circular cross section along at least a portion of its length.

4. The welded bracket as defined in claim 3, wherein said second circumferential plate section and said intermediate radial plate section in an unjoined state are separated by second upper and lower circumferential grooves, and said second circumferential weld joint is made by a process comprising the steps of melting weld material inside said second upper circumferential groove by discharging an arc of electric current from said tip of said first electrode, melting weld material inside said second lower circumferential groove by discharging an arc of electric current from said tip of said second electrode, and solidifying said melted weld material to form fused beads.

5. The welded bracket as defined in claim 1, wherein said circumferential weld joints are welded by an electrode having a tip which travels at speeds not less than 12 inches per minute during melting.

6. The welded bracket as defined in claim 1, wherein said first circumferential plate section and said intermediate radial plate section in an unjoined state are separated by first upper and lower circumferential grooves, and said second circumferential plate section and said intermediate radial plate section in an unjoined state are separated by second upper and lower circumferential grooves, each of said first and second upper and lower circumferential grooves having a bevel angle less than 5°.

7. The welded bracket as defined in claim 1, wherein said first circumferential plate section and said intermediate radial plate section in an unjoined state are separated by first upper and lower circumferential grooves, and said second circumferential plate section and said intermediate radial plate section in an unjoined state are separated by second upper and lower circumferential grooves, each of said first and second upper and lower circumferential grooves having a bevel angle substantially equal to 3°.

8. The welded bracket as defined in claim 1, wherein said circumferential weld joints are welded by an electrode comprising a flat blade made from a sheet of electrically conductive material.

9. A repaired core shroud of a light water nuclear reactor, comprising:

a first circular cylindrical shroud section having a first radius;

a second circular cylindrical shroud section coaxial with said first circular cylindrical shroud section and having a second radius less than said first radius;

an annular support ring connected to a bottom portion of said first circular cylindrical shroud section by a first shroud girth weld and connected to a top portion of said second circular cylindrical shroud section by a second shroud girth weld;

a welded bracket comprising first and second plate sections connected to a third plate section by first and second weld joints respectively, said first and second plate sections extending perpendicular to said third plate section and in opposite directions;

first fastening means for fastening said first plate section of said welded bracket to said first circular cylindrical shroud section; and second fastening means for fastening said second plate section of said welded bracket to said second circular cylindrical shroud section.

10. The repaired shroud as defined in claim 9, wherein said first weld joint is made by discharging an arc of electric current from a tip of an electrode, said electrode comprising a blade having an end joined and electrically connected to said tip of said electrode, said blade of said electrode having a non-circular cross section along at least a portion of its length.

11. The repaired shroud as defined in claim 9, wherein said second weld joint is made by discharging an arc of electric current from a tip of an electrode, said electrode comprising a blade having an end joined and electrically connected to said tip of said electrode, said blade of said electrode having a non-circular cross section along at least a portion of its length.

12. The repaired shroud as defined in claim 9, wherein said first fastening means comprise a pin having a threaded portion with a longitudinal axis and a tapered portion with a conical surface of revolution about said longitudinal axis.

13. The repaired shroud as defined in claim 9, wherein said second fastening means comprise a pin having a threaded portion with a longitudinal axis and a tapered portion with a conical surface of revolution about said longitudinal axis.

14. The repaired shroud as defined in claim 9, wherein at least one of said first and second fastening means comprises:

a pin having a threaded portion with a longitudinal axis and a tapered portion with a conical surface of revolution about said longitudinal axis;

sleeve means having internal surface means which match said conical surface of said pin and external surface means which match a circular hole in a respective one of said first and second circular cylindrical shroud sections when said sleeve means is in a first state, said internal surface means being in contact with said tapered portion of said pin and said external surface means being in contact with said circular hole, and having flange means with a maximum dimension less than said radius of said circular hole when said sleeve means is in a second state; and a threaded nut threadably engaging said threaded portion of said pin for blocking displacement of said pin in one direction along said longitudinal axis;

wherein said flange means blocks displacement of said pin in a direction opposite to said one direction when said sleeve means is in said first state.

15. The repaired shroud as defined in claim 9, wherein each of said first and second weld joints is generally oriented in a vertical direction.

16. The repaired shroud as defined in claim 9, wherein said annular support ring is a top guide support ring.

17. A method for making a shroud repair bracket, comprising the steps of:

forming a first curved plate in the shape of a longitudinal section of a circular cylinder having a first radius and having an arcuate radially inwardly projecting extension with a first double-bevel endface facing radially inward, said first double-bevel endface comprising an arcuate radially inwardly projecting first land along the midplane thereof and upper and lower beveled surfaces extending respectively upward and downward from said first land;

forming a second curved plate in the shape of a longitudinal section of a circular cylinder having a second radius less than said first radius and having an arcuate radially outwardly projecting extension with a second double-bevel endface facing radially outward, said second double-bevel endface comprising an arcuate radially outwardly projecting second land along the midplane thereof and upper and lower beveled surfaces extending respectively upward and downward from said second land;

forming a third curved plate in the shape of a section of an annular ring having a third double-bevel endface facing radially outward and a fourth double-bevel endface facing radially inward, said third double-bevel endface comprising an arcuate radially outwardly projecting third land along the midplane thereof and upper and lower beveled surfaces extending respectively upward and downward from said third land, and said fourth double-bevel endface comprising an arcuate radially inwardly projecting fourth land along the midplane thereof and upper and lower beveled surfaces extending respectively upward and downward from said fourth land;

supporting said first, second and third curved plates so that said first and third lands are in abutment and said second and fourth lands are in abutment, whereby opposing upper beveled surfaces of said first and third curved plates define a first upper circumferential groove, opposing upper beveled surfaces of said second and third curved plates define a second upper circumferential groove, opposing lower beveled surfaces of said first and third curved plates define a first lower circumferential groove, and opposing lower beveled surfaces of said second and third curved plates define a second lower circumferential groove;

melting weld material inside each of said first and second upper and lower circumferential grooves; and solidifying said melted weld material to form first and second weld joints.

18. The method as defined in claim 17, wherein said weld material is melted by discharging an arc of electric current from a tip of an electrode comprising a blade having a non-circular cross section along at least a portion of its length.

19. The method as defined in claim 17, wherein said weld material is melted by discharging an arc of electric current from a tip of an electrode which travels at speeds not less than 12 inches per minute during melting.

20. The method as defined in claim 17, wherein said steps of melting and solidifying are performed in an inert gas atmosphere comprising hydrogen or helium or both.

* * * * *